United States Patent [19]

Chinn et al.

[11] Patent Number: 5,725,782
[45] Date of Patent: Mar. 10, 1998

[54] ENVIRONMENTAL FILTER

[75] Inventors: Andrew W. Chinn; Daniel M. Strawser, Sr., both of Grove City; Geralde M. Chinn, Columbus, all of Ohio

[73] Assignee: Dandy Enterprises Limited, Grove City, Ohio

[21] Appl. No.: 769,597

[22] Filed: Dec. 18, 1996

Related U.S. Application Data

[62] Division of Ser. No. 439,361, May 11, 1995.

[51] Int. Cl.$^6$ .................................................. E03F 1/00
[52] U.S. Cl. .......................... 210/767; 210/164; 210/484; 210/492; 404/4
[58] Field of Search .................... 210/162, 163, 210/164, 165, 166, 170, 470, 454, 490, 492, 496, 767, 806; 405/16, 21, 36, 41, 52, 66; 404/2, 3, 4, 5

[56] References Cited

U.S. PATENT DOCUMENTS

| | | | |
|---|---|---|---|
| 4,988,235 | 1/1991 | Hurley | 210/164 |
| 5,107,635 | 4/1992 | Carpenter | 210/484 |
| 5,171,437 | 12/1992 | Fletcher, Sr. | 210/484 |
| 5,345,741 | 9/1994 | Slater et al. | 210/164 |
| 5,372,714 | 12/1994 | Logue, Jr. | 210/163 |
| 5,405,539 | 4/1995 | Schneider | 210/163 |

*Primary Examiner*—Neil McCarthy
*Assistant Examiner*—Theodore M. Green
*Attorney, Agent, or Firm*—Standley & Gilcrest

[57] ABSTRACT

A filter for removing particulate matter from water flowing into an inlet, such as a catch basin is disclosed. The filter may comprise an envelope of filter material adapted to receive an inlet cover device, such as a catch basin gate. The inlet device may be inserted within the envelope and placed in an opening of the inlet. Water, for example, may then be double filtered before entering the inlet. A roll filter comprising porous material is also disclosed that may be used in combination or alone when filtering runoff entering a curb drain or other inlet.

6 Claims, 2 Drawing Sheets

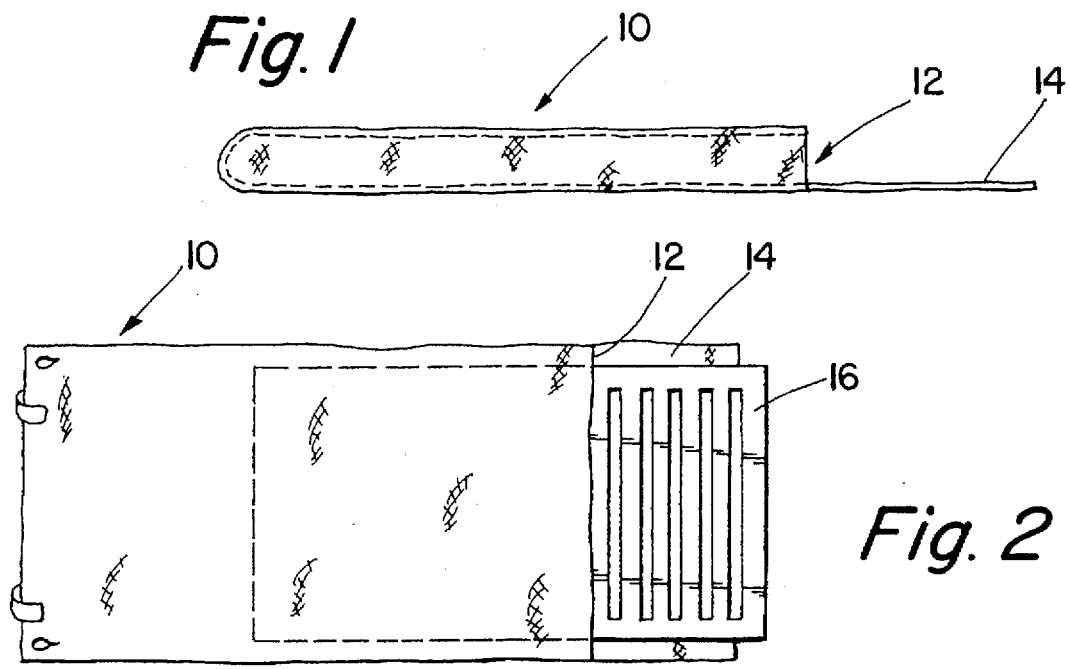
Fig. 1
Fig. 2
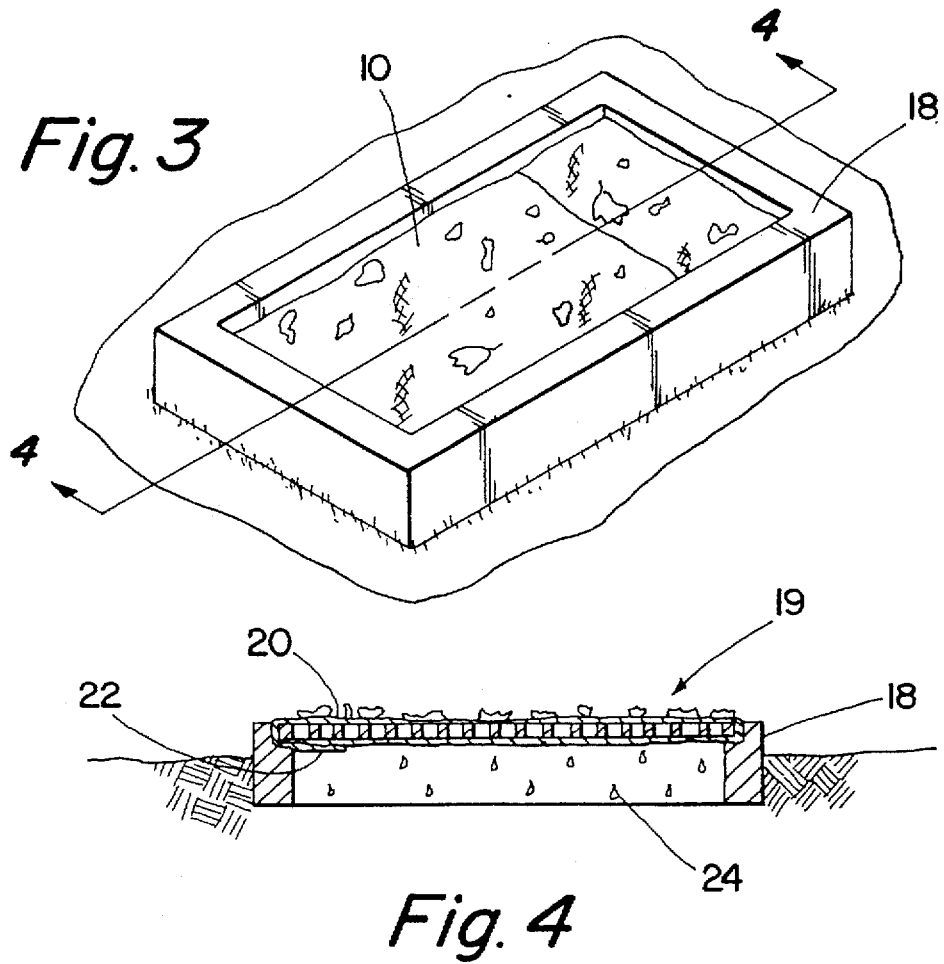
Fig. 3
Fig. 4

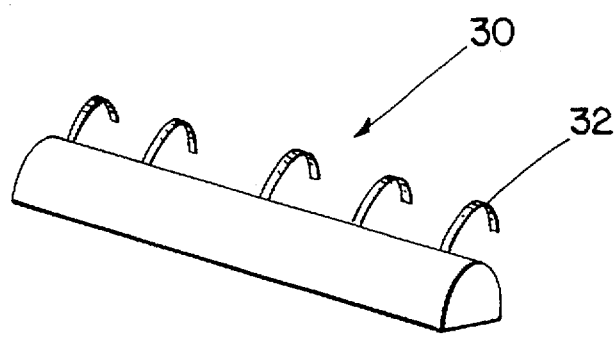
Fig. 5
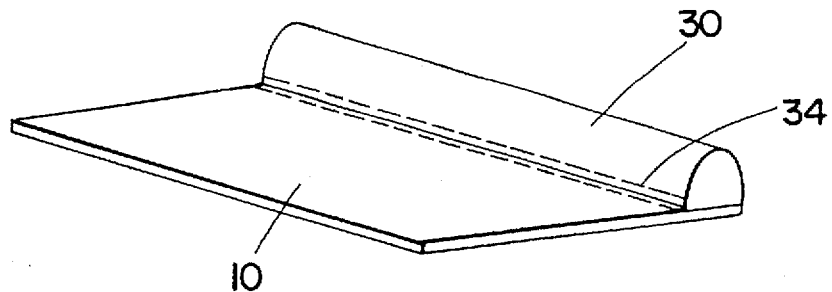
Fig. 6
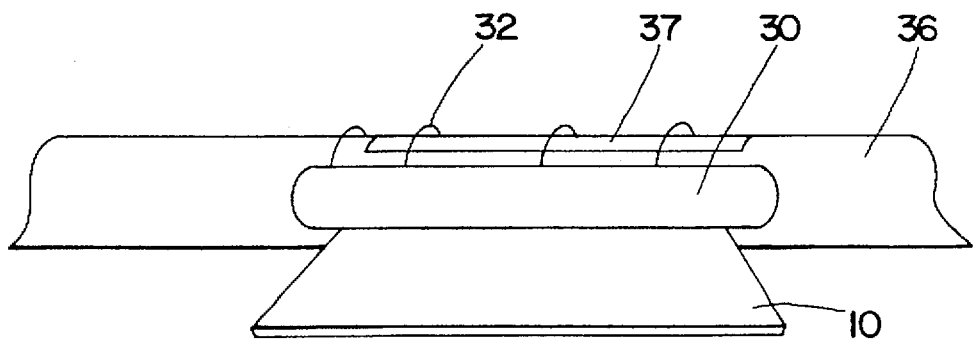
Fig. 7

5,725,782

ENVIRONMENTAL FILTER

This application is a divisional of application Ser. No. 08/439,361 filed May 11, 1995.

BACKGROUND AND SUMMARY OF THE INVENTION

The present invention relates generally to a system for use in filtering a variety of environmental substances, and more particularly to a method and apparatus for filtering such substances as soil, sediment, and debris from such things as water runoff that may be entering storm drains or catch basins for example.

In recent years, State and Federal governments have placed controls on sources of pollution and on circumstances that may lead to erosion of an environmentally protected substance.. One source of water pollution is called runoff. Runoff can include dust and other particulates from roads, leaves from trees, top soil, grass cuttings from lawns and parks and fallout from air pollution. Runoff can be particularly problematic when the source of water is from an area of ground which has been disturbed or broken up, such as may be found at construction sites. Runoff from these areas may contain a high amount of soil and debris. Additionally, runoff caused by a storm may be particularly heavy and dynamic and therefore may carry a great deal of particulates in a short period of time. During a storm the rate of storm water runoff can be several times the normal flow. Various methods have been developed in an attempt to minimize the adverse effects of runoff The present invention is designed to provide an easy to install and maintain environmental filter system. The present invention includes an envelope of filter material which is proportioned to receive an inlet device such as a storm sewer grate. The envelope may be of various sizes to accept inlet devices of varying size. The present invention may comprise porous fabric that may be stitched, glued, welded, riveted, or otherwise formed into an enclosure or envelope to house an inlet device. In a separate embodiment the present invention also may include a roll of erosion matting. The roll may be utilized alone or along with the envelope of filter material to prevent silt, rocks, debris, etc. from entering curb inlets.

For example, a storm sewer grate may be placed within the filter envelope of the present invention and then positioned on the catch basin in its customary location. The present invention may prohibit soil, rubble, stones, or debris from entering the sewer. The present invention avoids the necessity of removing soil, silt, stones and other particulate matter from within the sewer and thus avoids the expense and cost associated with such filters.

Additionally, the present invention may act as a double filter for the runoff. The present invention surrounds the inlet device and therefore is located both above and below the inlet device. For example, water entering a sewer grate will be filtered both by the layer of fabric located above the grate and by the layer of fabric located below the grate since the grate will reside inside the envelope formed by the fabric.

Maintenance and cleaning of the present invention may only involve periodic removal of particulate matter that may build up on the inlet device. Removal of the present invention may involve merely lifting the inlet device and removing the device from the filter envelope. Alternatively, the filter of the present invention may be cleaned or another filter may be used to again receive the inlet device, such as a sewer grate, and be installed onto the inlet, such as a catch basin.

The roll filter of the present invention provides additional drainage area to the filter envelope. Additionally, use of the roll filter may provide rigidity to the filter envelope to prevent the water pressure from forcing the filter into the inlet.

These and other advantages will be apparent from the following detailed description of the invention, drawings, and claims.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 is a side view of a preferred embodiment of the present invention;

FIG. 2 is a plan view of the embodiment of FIG. 1 with a storm sewer gate inserted halfway into the sack of the present invention;

FIG. 3 is a prospective view of one embodiment of the present invention installed on a storm drain;

FIG. 4 is a section view taken along line 4—4 of FIG. 3;

FIG. 5 is a perspective view of one embodiment of the roll filter of the present invention;

FIG. 6 is a perspective view of the roll filter combined with the filter envelope; and FIG. 7 is a perspective view of the roll filter and the filter envelope installed on a curb drain.

DETAILED DESCRIPTION OF PREFERRED EMBODIMENT(S)

Referring to FIG. 1, a filter envelope 10 of the present invention may be seen. The filter may comprise a water permeable fabric or composition of fabrics or other suitable material conducive to filtering out debris, soil and sediments, while allowing water to pass through the filter. The filter may be constructed from a single portion of fabric which has been folded back on itself and stitched or otherwise secured along its edges. Preferably, the filter has an opening 12 configured to receive an inlet device, such as a sewer grate. Additionally, the envelope may have a flap 14 to enclose the inlet device within the filter. FIG. 2 shows the filter envelope 10 of FIG. 1 with the inlet device 16 partially inserted inside the filter 10. The filter envelope 10 comprises a lower section of filter material, said lower section having four extents, and an upper section of filter material, said upper section having four extents, wherein three of said upper section extents are connected to three of said lower section extents. The inlet device 16 may be inserted completely within the filter envelope 10 and the flap 14 may be inserted within the opening 12 to enclose the inlet device 16 within the filter envelope 10.

Referring to FIGS. 3 and 4, an example of the operation and installation of the filter envelope 10 of the present invention may be seen. After a sewer grate 16 has been enclosed within the filter envelope 10, the sewer grate may be placed within a catch basin 18 in its customary position as shown. The filter envelope 10 encloses the sewer grate on both an upper surface 20 and a lower surface 22. As runoff 24 flows into the catch basin 18, it may be filtered by both the upper and lower surfaces of the filter envelope 10 at 20 and 22 respectively. This may effect a double filtering of the runoff 24 that enters the catch basin 18.

Referring to FIG. 5, a roll filter 30 of the present invention is shown. The main body of the roll filter may comprise turf reinforcement matting or other porous material. The matting material may comprise ½ inch of coconut fibre stitched between ultraviolet stabilized polypropylene mesh. This material may be cut into rectangular pieces and rolled to approximate a cylinder and may be inserted into a robe of geotextile material. Preferrably, matting is cut into 48"×42" pieces and rolled to form a cylinder of 8" or 12" diameter. Additionally, matting may be sewn, glued, welded, or secured in other commonly known ways onto the ends of the roll. Steel straps 32 may also be embedded into the roll. It is recognized that several means of securing the roll to the inlet are readily available and would be apparent to those of ordinary skill in the art. The straps 32 may be replaced with weights, pins, hooks, anchors, and other well known means for preventing movement of any device exposed to nature's elements. FIG. 6 shows another embodiment of the present invention where the roll filter 30 is sewn at 34 to a filter envelope 10.

FIG. 7 shows how the roll filter 30 and the filter envelope 10 may be combined to filter runoff that is entering a curb drain 36 on a street 38.. The roll filter 30 may have straps 32 that may hook over the curb drain 36 or structure hood 37 to provide additional structural support. The roll filter 30 may be sewn or otherwise secured to the filter envelope 10 or may just be positioned upon the filter envelope 10.

The present invention has been described in the form of preferred embodiments, but it is to be recognized that several modifications and variations to the invention could be made and fall within the scope of the subjoined claims.

What is claimed is:

1. A catch basin water filter, comprising:
   a catch basin having an opening configured to receive a grate;
   a catch basin grate positioned within said catch basin opening; and
   an envelope of filter material enclosing said grate.

2. The filter of claim 1, wherein said envelope comprises:
   a lower section of filter material, said lower section having four extents; and
   an upper section of filter material, said upper section having four extents, wherein three of said upper section extents are connected to three of said lower section extents.

3. The filter of claim 2, wherein one of said connected upper and lower section extents are integral with each other.

4. The filter of claim 2, wherein two of said connected upper and lower section extents are sewn together.

5. The filter of claim 2, further comprising a flap integral with said lower section.

6. A method for filtering water flowing into a catch basin, said catch basin having an opening covered by a grate, comprising:
   providing an envelope of filter fabric, said filter fabric being water-permeable, a roll filter being attached to a length of said envelope;
   inserting said grate into said envelope; and
   placing said grate, enclosed in said envelope and with said roll filter attached to said envelope, over said opening in said catch basin,
   wherein said envelope of filter fabric filters solid materials from entering said catch basin while said grate and said envelope allow water to pass therethrough into said catch basin and wherein said envelope and said roll filter are maintained in position by said grate.

* * * * *

UNITED STATES PATENT AND TRADEMARK OFFICE
CERTIFICATE OF CORRECTION

PATENT NO. : 5,725,782
DATED : March 10, 1998
INVENTOR(S) : Andrew W. Chinn, et. al.

It is certified that error appears in the above-indentified patent and that said Letters Patent is hereby corrected as shown below:

Column 3, line 5 delete the word "robe" and replace it with --tube--.

Signed and Sealed this

Twenty-eighth Day of July, 1998

Attest:

BRUCE LEHMAN

Attesting Officer     Commissioner of Patents and Trademarks